EUGENE W. KONRAD
INVENTOR.

ATTORNEYS

EUGENE W. KONRAD
INVENTOR.

ATTORNEYS understand # United States Patent Office 3,491,617
Patented Jan. 27, 1970

1

3,491,617
HYDROKINETIC TORQUE CONVERTER TRANSMISSION MECHANISM WITH AN OVERDRIVE GEAR RATIO
Eugene W. Konrad, Northville, Mich., assignor to Ford Motor Company, Dearborn, Mich., a corporation of Delaware
Filed Feb. 24, 1967, Ser. No. 618,425
Int. Cl. F16h 47/08, 57/10; F16d 33/00
U.S. Cl. 74—688     2 Claims

ABSTRACT OF THE DISCLOSURE

A power transmission mechanism comprising a compound planetary gearset and a hydrokinetic torque converter. An overdrive clutch is used in combination with a reaction brake to produce an overdrive ratio in addition to the three speed ratios that are available with the same gearing when the overdrive clutch is inactive.

Brief summary of the invention

My invention relates generally to automotive vehicle drivelines capable of establishing multiple torque delivery paths between a vehicle engine and vehicle traction wheels with each path being characterized by a different driving speed-ratio. My invention relates more particularly to multiple speed-ratio power transmission mechanisms for an automotive driveline wherein the highest speed-ratio is an overdrive ratio. It may be used with conventional components of known transmission systems.

It is an object of my invention to provide a hydrokinetic power transmission mechanism having an overdrive gear ratio in addition to two underdrive ratios and a direct drive ratio for forward drive operation and wherein ratio shifts from one ratio to the other can be accomplished readily by controlling the application and release of clutch and brake members in the transmission system that control the relative motion of gear elements. I contemplate that the clutch and brake members can be controlled with a maximum degree of smoothness without a serious timing problem in the application and release of the clutch and brake members.

It is a further object of my invention to provide a hydrokinetic, multiple-ratio transmission system of the type above set forth wherein a high speed-ratio can be established as the system is conditioned for a split torque delivery path, one portion of the torque delivery path being mechanical and the other portion being hydrokinetic.

It is a further object of my invention to provide a transmission system of the type above set forth wherein the high speed-ratio, direct-drive operating range can be obtained with a unitary, direct, fully-mechanical driving connection between the engine and the transmission output shaft or, in the alternative, it can be obtained when the transmission system is conditioned for split torque delivery with part of the torque being delivered hydrokinetically and the balance of the torque being delivered mechanically.

Particular description of the invention

Figure 1:
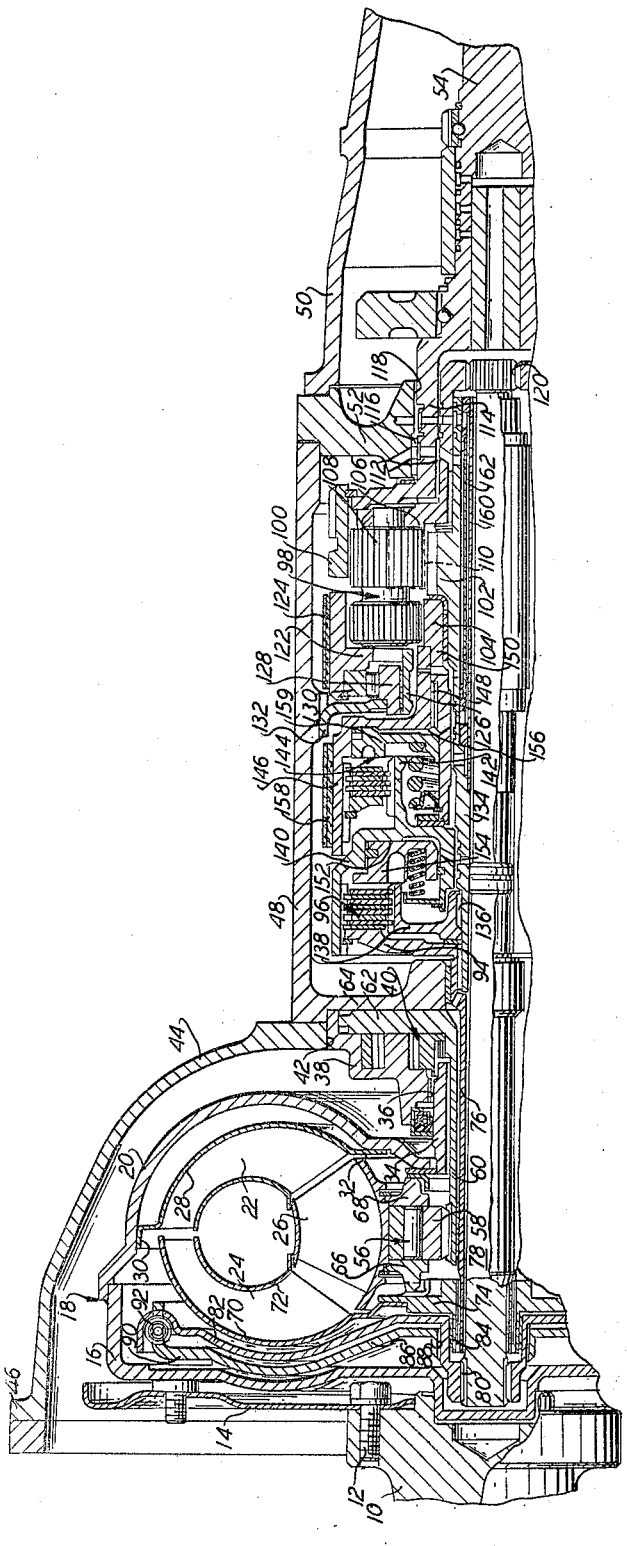
FIGURE 1 shows in longitudinal cross-sectional form an assembly view of the torque transmitting elements of my transmission; and, FIGURE 2 is a schematic representation of the structure of FIGURE 1 modified to include a non-synchronous, 2–3 upshift feature.

Numeral 10 in the drawings designates the flanged end of an engine crankshaft 10, which is bolted by bolts 12 to the hub of the drive plate 14. The periphery of the drive plate 14 is bolted to a converter shell part 16 which forms a part of a converter shell assembly 18. An impeller shell part 20 of the assembly 18 is welded to the periphery of the part 16 to form a closed torque converter torus cavity.

The assembly 18 comprises a part of a hydrokinetic torque converter having a bladed impeller 22, a bladed turbine 24 and a bladed stator 26. The impeller 22 comprises an outer impeller shroud 28 which is secured at its outer margin 30 to the inner wall of the shell part 20. The inner margin of the shroud 28 is secured at 32 to the inner region of the inner wall of the shell part 20.

Shell part 20 is welded to an impeller hub 34 journaled within an opening 36 formed in housing wall 38 for a positive displacement pump 40. Wall 38 is located within an opening 42 formed in transmission housing part 44 which encloses the torque converter. The outer periphery 46 of the housing part 44 is secured to the engine block of the vehicle engine.

The forward end of a transmission housing part 48 is secured to the right-hand end of the housing part 44. A tail-shaft extension housing 50 is secured to an end bearing support wall 52, which in turn is secured to the right-hand end of the housing part 48. Extension housing 50 encloses driven shaft 54 which may be connected by means of a driveshaft and differential and axle assembly to the vehicle traction wheels.

Stator 26 includes an overrunning brake 56 having an internally splined inner race 58 which is secured to stationary sleeve shaft 60, the latter being connected to a flange 62 secured to the housing 38. A transverse bearing support wall 64 is located adjacent the flange 62. Spacers 66 and 68 are situated on each axial side of the brake 56 to axially position the stator 26 with respect to the turbine 24 and the impeller 22.

The turbine 24 includes an outer blade shroud 70 and an inner blade shroud 72 which define radial inflow passages. Shroud 70 is secured drivably to a turbine hub 74 which in turn is splined to turbine shaft 76. This surrounds a central torque delivery shaft 78 which is splined at 80 to a lock-up clutch member 82. This member extends radially outwardly between shroud 70 and shell part 16.

Clutch member 82 is journaled on hub 74 by a bushing 84. A movable clutch piston 86 in the form of a disc is located between clutch element 82 and the shell part 16. It can shift axially with respect to the shell part 16, a bushing 88 being provided for this purpose between the hub of element 86 and the hub of clutch element 82. The periphery of the clutch element 86 carries a friction disc 90 which is adapted to engage frictionally an adjacent friction surface on the inside of the shell part 16. A resilient damper spring connection is provided at 92 between the outer periphery of clutch piston 86 and the outer periphery of clutch element 82.

Turbine sleeve shaft 76 is connected to front clutch member 94. This forms a part of a multiple-disc, selectively-engageable friction clutch 96 which is engaged during forward drive operation and released in neutral and in reverse drive.

The transmission system includes gearing 98 which has a ring gear 100, a small diameter sun gear 102, a larger diameter sun gear 104 and a carrier 106. A set of compound planet pinions 108 is journaled rotatably on the carrier 106. One gear portion of each pinion 108 engages drivably sun gear 104 and the other part engages drivably ring gear 100. The pinion part that engages ring gear 100 engages also short planet pinions 110 journaled rotatably on the carrier 106. Pinions 110 engage also sun gear 102. Carrier 106 is journaled by means of a bushing 112 in a sleeve 114 which in turn is journaled by means of bushing 116 within an opening 118 formed in end wall 52. Carrier 106 is splined at 120 to shaft 78.

Carrier 106 is connected to or is formed partly by a brake drum 122 around which is positioned a low speed ratio and reverse brake band 124. Band 124 can be applied and released by means of a fluid pressure operated servo in the usual fashion.

Brake drum 122 includes a bearing shoulder 126 received within the inner race 128 of an overrunning brake assembly 130. Race 128 is secured to a transmission center support wall 132.

Overrunning brake 130 may be in the form of rollers which are situated between the brake drum 122 and the race 128. One of the races for brake 130 can be cammed to permit camming action with the rollers thereby inhibiting rotation of the carrier in one direction to provide torque reaction for the gearing during low speed ratio operation.

Ring gear 100 is connected directly to the sleeve 114, the latter in turn being connected directly to the power output shaft 54. Sun gear 102 is connected to a first sun gear sleeve shaft 134 which is splined at 136 to clutch member 138 of the forward clutch 96. This member 138 carries internally splined clutch discs which are situated adjacent externally splined clutch discs carried by clutch cylinder 140. Cylinder 140 in turn is formed with a clutch element 142 which carries internally splined clutch discs for a rear clutch disc assembly 144 which is engaged during high speed ratio operation and during reverse drive. Externally splined discs of the assembly 144 are carried by clutch cylinder 146 which is splined at 148 to clutch sleeve 150. The sun gear 104 is connected directly to the sleeve 150 as shown.

Cylinder 140 is formed with an annular working chamber 152 within which is positioned clutch piston 154. Piston 154 is returned to the inactive position by a plurality of return springs. The clutch discs of the assembly 96 are engaged by the piston 154 when pressure is introduced into the working chamber 152. In a similar fashion clutch cylinder 146 is formed with a working chamber 156 within which is positioned an annular piston 159. When fluid pressure is admitted to the working chamber 156, the piston 159 engages the discs of the clutch assembly 144. The piston 159 is returned to the inactive position by a return spring.

Cylinder 146 defines also a brake drum about which is positioned an intermediate speed ratio brake band 158. Like the band 124, the band 158 can be applied and released selectively by means of a fluid pressure operated servo, not shown.

The fluid passage structure that controls distribution of pressurized fluid to the clutch servo working chambers, is defined in part by sleeves 160 and 162 received within the annular space between sun gear sleeve shaft 134 and the central shaft 78. This sleeve and shaft arrangement provides three concentric, annular feed passages, two of which are used for the clutch servos and the other being used for distributing lubrication oil to various lubrication points in the gearing.

To establish forward drive, low speed-ratio operation, the forward clutch assembly 96 is applied. The friction clutch within the impeller shell, which will be referred to subsequently as the overdrive clutch, is released. The multiple disc clutch assembly 144 is released and brake band 158 is released. Brake band 124 can either be released or applied depending upon whether the continuous operation in the low speed ratio range is desired. If brake band 124 is applied, the carrier 106 is capable of accommodating torque reaction in both direction. If automatic upshifts are desired, however, the carrier 106 is anchored solely by overrunning brake band 130 and brake band 124 is released.

When the transmission system is so conditioned, the turbine torque that is developed is distributed through turbine shaft 76 and through the forward clutch to sun gear shaft 134. Sun gear 102 then is driven by the turbine. It in turn drives planet pinions 110. These drive planet pinions 108, which drive ring gear 100 in the power output shaft 54 in the same direction as the direction of rotation of the impeller, although at a reduced speed ratio. Carrier 106 is inhibited from rotating by the reaction brake 130 or 124.

To cause an automatic upshift from the low speed ratio range to the intermediate speed-ratio range, brake 158 is applied. The application of the brake 158 is the only control function that is needed to establish a ratio shift from the low speed-ratio to the intermediate speed ratio assuming, of course, that the brake band 124 is released. Under these conditions the sun gear 104 becomes a reaction member. This then causes the planet pinions 108 to ride around the sun gear 104, thus driving the carrier 106. This speeds up the motion of the ring gear 100 with respect to the driving speed of sun gear 102. Output shaft 54 then is driven at an increased speed ratio. This intermediate speed-ratio is an underdrive ratio, but it is higher than the low speed-ratio.

The overdrive clutch still is disengaged during intermediate speed-ratio operation, but the forward drive clutch assembly 96 remains applied.

High speed-ratio operation is achieved by engaging simultaneously both clutch assemblies 96 and 144 while both brake bands 158 and 124 are released. This connects together for rotation in unison each of the elements of the planetary gear unit 98 so that a 1:1 ratio is achieved. Direct drive can be achieved also by disengaging the rear clutch assembly 144 and applying instead the overdrive clutch. This establishes a partial mechanical torque feed path and a partial hydrokinetic torque feed path through the converter.

Engine torque is delivered initially through the overdrive clutch and through the shaft 78 to the carrier 106. The sun gear then will tend to be driven in the same direction as the direction of rotation of the engine. The torque imparted to the sun gear 102 is distributed through the engaged clutch disc assembly 96 and hence to the turbine. This tends to overspeed the turbine in the direction of rotation of the impeller thereby causing a torque feedback to the impeller. The torque feedback supplements the torque distributed mechanically. I have achieved, therefore, a dual operating range during high speed ratio operation. If desired, the transmission can be caused to upshift from the intermediate ratio to the split torque high speed-ratio and then subsequently it can be shifted to the fully mechanical high speed ratio. In this way maximum cushioning in the ratio shift is accomplished without sacrificing the economy characteristic of the fully mechanical drive.

To achieve overdrive operation, the overdrive clutch is applied and the brake band 158 is applied. The multiple disc clutch 144 is released. If, prior to a shift to the overdrive ratio, the transmission had been operating in the split torque delivery, regenerative, high speed-ratio drive condition, the clutch disc assembly 144 will have been released. This would simplify the shift pattern.

During overdrive operation, engine torque is distributed generally mechanically through the overdrive clutch and through shaft 78 to the carrier 106. Sun gear 104 acts as a reaction member since it is anchored by the overdrive brake 158. Ring gear 100 and power output shaft 54 thus are driven at an overdrive ratio with respect to the speed of the engine crankshaft. No torque is distributed hydrokinetically. The turbine 24 simply moves in the circuit in a free-floating condition as the forward clutch assembly 96 is disengaged. The overrunning brake 130 freewheels under these conditions since it is being driven in a direction opposite to the direction of the torque reaction during low speed-ratio drive. Brake band 124, of course, is released to permit forward, freewheeling motion of the carrier 106.

This transmission system simplifies the clutch and brake engagement and release sequence, thereby making possible a simplified control system. If, for example, a downshift is required from the overdrive ratio to the high speed ratio for engine braking purposes, it merely is necessary to disengage the overdrive clutch and to engage instead the front clutch assembly 96. This will condition the driveline for engine braking in the usual fashion. This simply requires disengagement of one clutch and the application of the other, which is a rather simple control function.

Reverse drive is accomplished merely by disengaging both the overdrive clutch and the clutch assembly 96 and by applying clutch assembly 144. Brake band 158 is released and brake band 124 is applied. Turbine torque then is distributed through turbine shaft 76 and through clutch assembly 144 to the sun gear 104. Since the carrier 106 is braked by the brake band 122, it can serve as a reaction member as torque is delivered to the ring gear 100, thus driving the ring gear 100 and the power output shaft 54 in a reverse direction with respect to the direction of rotation of the engine.

Figure 2:
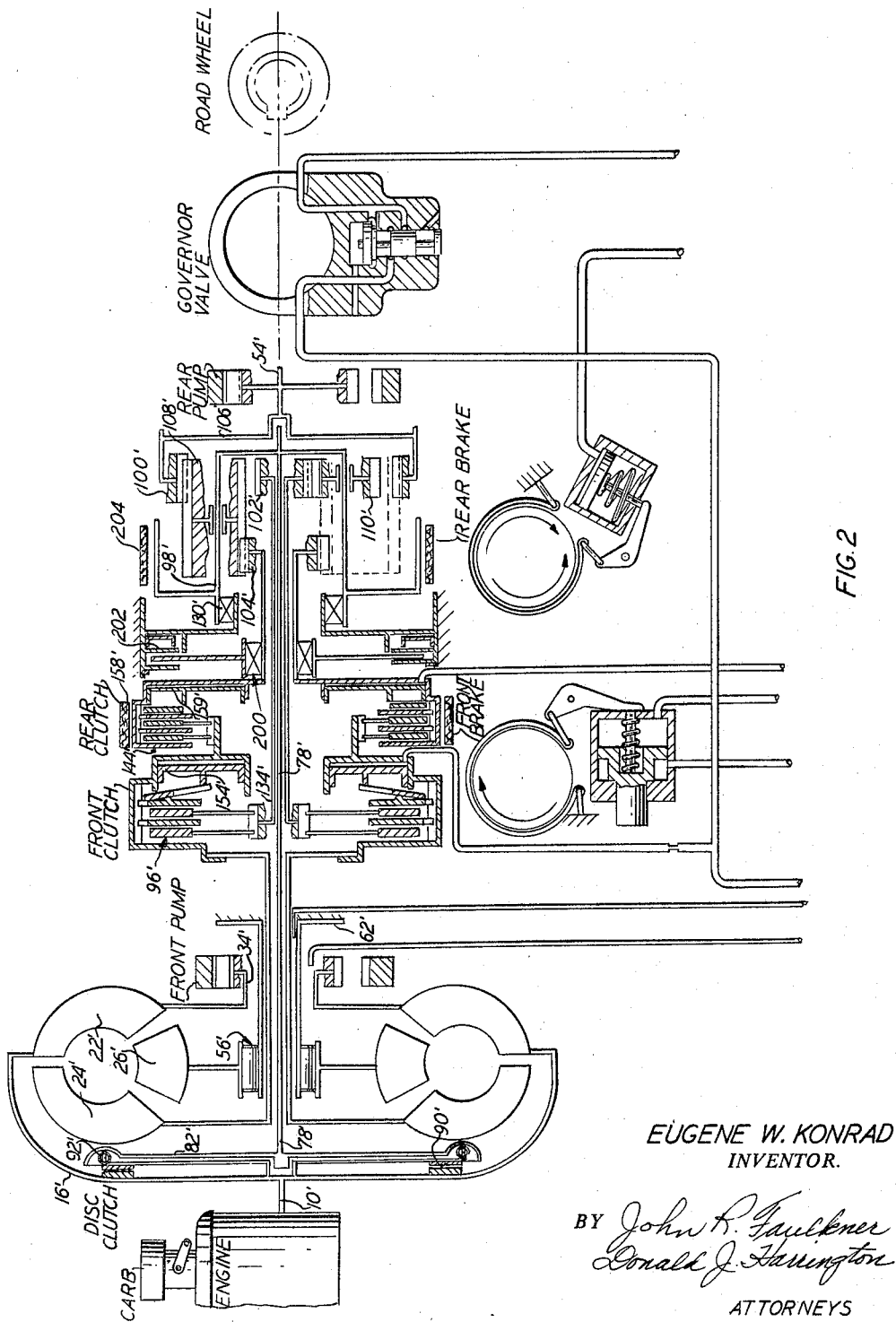

In FIGURE 2 I have illustrated an alternate gearing arrangement that employs an additional overrunning brake 200, which is used to anchor the forward sun gear of the gear unit 98'. The elements of the gear system of FIGURE 2 that have counterparts in the FIGURE 1 construction have been represented by similar reference characters although prime notations are added.

The outer race of the brake 200 is anchored by a disc brake 202. Further, the brake band 124 in FIGURE 1 can be replaced by a disc brake 204.

The shift sequences in the FIGURE 2 arrangement are similar to the shift sequence described previously with reference to FIGURE 1. The only exception is the shift from the intermediate speed ratio to the high speed ratio, which is a so-called "pick-up" shift. Whenever the brake band 158' is disengaged during a normal shift sequence, the forward sun gear of the gear unit 98' is anchored by overrunning brake 200 and the disc brake 202. Brake band 158' would not be required unless coast braking in the intermediate ratio is needed.

The overdrive clutch is engaged by the force of the pressure in the torus cavity of the converter as the annular cavity between shell part 16 and disc 86 is exhausted. The overdrive clutch can be released by reversing the direction of torus fluid feed. The annular space between shell part 16 and disc 86 in this case acts as a part of the toroidal fluid delivery passage.

Having thus described preferred forms of my invention, what I claim and desire to secure by U.S. Letters Patent is:

1. A multiple speed-ratio power transmission mechanism for delivering driving power from a driving member to a driven member, a hydrokinetic unit comprising a bladed impeller and a bladed turbine in a common torus circuit in fluid flow relationship, said impeller being connected drivably to said driving member, a planetary gear unit comprising first and second power input elements, a power output element, a reaction element, said gear unit elements being disposed in geared relationship, said output element being connected to said driven member, first brake means for anchoring said reaction element against rotation during low speed ratio operation, first selectively engageable clutch means for connecting directly said turbine to said first power input element to condition said gear unit for low speed ratio operation with said first brake means applied, second brake means for anchoring said second power input element against rotation during intermediate speed ratio operation whereby said second power input element acts as a reaction member as said first brake means is inactive, second clutch means for connecting said second power input element to said turbine as both of said brake means are inactive and said first clutch means is applied thereby establishing direct drive operation, selectively engageable overdrive clutch means for connecting directly said impeller to said low speed ratio reaction element as said second brake means is applied, whereby said second power input element acts as a reaction member during overdrive operation with said first clutch means released and said first brake means released, said converter comprising a converter shell enclosing said impeller and said turbine to form a sealed cavity, said overdrive clutch means comprising a friction member situated in said converter shell between said turbine and an adjacent inner wall of said shell, said friction member being exposed to the pressure of the fluid in said torus circuit, a torque delivery shaft extending concentrically with respect to said gear unit and said converter, said shaft being connected to a low speed-ratio reaction element in said gear unit and to said friction member whereby engine torque is delivered directly to said low speed-ratio reaction element, said overdrive clutch means comprising further a driveplate connected directly to said torque delivery shaft and extending radially outwardly between said inner wall of said shell and said turbine, said friction member being in the form of a pressure-operated disc, a friction surface formed on the radially outward region of said disc adjacent said inner wall, a resilient spring damper connected between said friction member and said radially extending driveplate, said friction member responding to a pressure build-up in said torus circuit as it is shifted axially into frictional engagement with said inner wall thereby establishing a direct driving connection between said impeller and said torque shaft.

2. A hydrokinetic power transmission mechanism comprising a driving member, a driven member, a hydrokinetic unit having an impeller and a turbine situated in toroidal fluid flow relationship in a common trous circuit, a gear unit, said gear unit comprising a pair of sun gears, a carrier, a ring gear, a set of long planet pinions and a set of short planet pinions situated in meshing engagement with each other, each set of planet pinions being rotatably mounted on said carrier, said short planet pinions engaging a first of said sun gears, said long planet pinions engaging said ring gear and a second of said sun gears, said ring gear being connected to said driven member, said driving member being connected to said impeller, first clutch means for connecting selectively said turbine to said first sun gear, second clutch means for connecting selectively said turbine to said second sun gear, first brake means for anchoring selectively said carrier during low speed-ratio, forward-drive operation and during reverse-drive operation, selectively engageable second brake means for anchoring said second sun gear during intermediate speed-ratio operation and during overdrive ratio operation, overdrive clutch means for connecting directly said driving member to said carrier during overdrive operation with said first and second clutch means and said first brake means released and said second brake means applied, said hydrokinetic unit comprising a shell enclosing said impeller and said turbine in a sealed cavity, said overdrive clutch means comprising a friction element situated in said shell cavity intermediate an inner wall of said cavity and said turbine, a torque delivery shaft extending concentrically through said gear unit and said hydrokinetic unit, said shaft being connected drivably to the friction element of said overdrive clutch and to the carrier for said gear unit, said overdrive clutch means comprising further a driveplate connected directly to said shaft and extending radially outwardly between said inner wall of said shell and said turbine, said friction member being in the form of pressure-operated disc, a friction surface formed on the radially outward region of said disc adjacent said inner wall, a resilient spring damper connected between said friction member and said radially extending driveplate, said friction member responding to a pressure build-up in said torus circuit as it is shifted axially into frictional engagement with said inner surface thereby establishing a direct driving connection between said impeller and said torque shaft.

References Cited

UNITED STATES PATENTS

| | | | |
|---|---|---|---|
| 2,901,923 | 9/1959 | Waclawek | 74—688 |
| 2,725,762 | 12/1955 | Hettinger et al. | 74—688 |
| 3,162,063 | 12/1964 | Konrad | 74—763 |
| 3,314,307 | 4/1967 | Egbert | 74—763 X |
| 3,355,966 | 12/1967 | Boehm | 74—688 |

ARTHUR T. McKEON, Primary Examiner

U.S. Cl. X.R.

74—763; 192—3.29